United States Patent
Sainath

(10) Patent No.: US 8,402,259 B2
(45) Date of Patent: Mar. 19, 2013

(54) ACCELERATING WAKE-UP TIME OF A SYSTEM

(75) Inventor: Venkatesh Sainath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 12/627,237

(22) Filed: Nov. 30, 2009

(65) Prior Publication Data

US 2011/0131399 A1    Jun. 2, 2011

(51) Int. Cl.
     *G06F 9/00*      (2006.01)
     *G06F 11/00*      (2006.01)
     *G06F 15/177*      (2006.01)

(52) U.S. Cl. .................. 713/1; 713/2; 714/6.1; 714/100

(58) Field of Classification Search .................. 713/1, 2; 714/100, 6.1
See application file for complete search history.

(56) References Cited

U.S. PATENT DOCUMENTS

| | | | |
|---|---|---|---|
| 6,158,000 A * | 12/2000 | Collins | 713/1 |
| 6,381,715 B1 * | 4/2002 | Bauman et al. | 714/718 |
| 7,065,688 B1 | 6/2006 | Moyes et al. | |
| 7,107,493 B2 * | 9/2006 | Nguyen et al. | 714/718 |
| 7,143,321 B1 | 11/2006 | Everett et al. | |
| 7,246,269 B1 | 7/2007 | Hamilton | |
| 7,251,744 B1 | 7/2007 | Housty | |
| 7,334,159 B1 * | 2/2008 | Callaghan | 714/42 |
| 7,487,222 B2 | 2/2009 | Begun et al. | |
| 7,539,909 B2 * | 5/2009 | LeClerg et al. | 714/718 |
| 7,555,677 B1 | 6/2009 | Wiley et al. | |
| 2004/0158688 A1 * | 8/2004 | Rentschler et al. | 711/167 |
| 2004/0158701 A1 * | 8/2004 | Merkin | 713/2 |
| 2005/0283566 A1 * | 12/2005 | Callaghan | 711/104 |
| 2006/0224685 A1 | 10/2006 | Begun et al. | |
| 2007/0283104 A1 | 12/2007 | Wellwood et al. | |
| 2008/0148034 A1 | 6/2008 | Henry et al. | |
| 2008/0195836 A1 * | 8/2008 | Muppirala et al. | 711/173 |
| 2009/0172257 A1 | 7/2009 | Prins et al. | |
| 2009/0172259 A1 | 7/2009 | Prins et al. | |
| 2009/0287900 A1 * | 11/2009 | Kirscht et al. | 711/173 |

FOREIGN PATENT DOCUMENTS

JP      2009277223 A    * 11/2009

* cited by examiner

*Primary Examiner* — Mark Connolly
(74) *Attorney, Agent, or Firm* — D'Ambrosio & Menon, PLLC

(57) ABSTRACT

A method for accelerating a wake-up time of a system is disclosed. The method includes scrubbing and making available for allocation a minimum amount of memory, executing a boot-up operation of an operating system stored on the system, and scrubbing and making available for allocation an additional amount of memory in parallel with and subsequent to the boot-up operation of the operating system. The system may include one or more nodes, each of the nodes having a minimum node resource configuration associated therewith that corresponds to a minimum number of processors included in a node that are required to be activated in order to activate the node. The system may further include one or more partitions, where each partition encompasses at least one node. Each partition may be assigned a priority in relation to other partitions, and the partitions may be successively activated based on the assigned priorities.

17 Claims, 4 Drawing Sheets

ACCELERATING WAKE-UP TIME OF A SYSTEM

BACKGROUND

As a result of the high integration density of contemporary computer memory chips and the concurrent reduction in size of individual memory cell structures, individual memory cells are increasingly vulnerable to bit errors caused by cosmic rays and/or alpha-particle emission. Such bit errors are known as soft errors. Although the probability of a soft error occurring at an individual memory bit is small, given the large amount of memory present in computers, particularly servers, the probability of soft errors in the total installed memory is significant. The invention relates generally to memory scrubbing, and more particularly to methods and apparati adapted to accelerate the wake-up time of a system.

SUMMARY

An embodiment of the invention includes a method for accelerating a wake-up time of a system. The method includes scrubbing and making available for allocation a minimum amount of memory, executing a boot-up operation of an operating system stored on the system, and scrubbing and making available for allocation an additional amount of memory in parallel with and subsequent to the boot-up operation of the operating system.

Another embodiment of the invention includes a system that includes a plurality of memory units, a scrubbing unit configured to scrub memory in the plurality of memory units and make the memory available for allocation, and an operating system. The scrubbing unit scrubs and makes available for allocation a minimum amount of memory, and a boot-up operation of the operating system is executed after the minimum amount of memory has been scrubbed and made available for allocation. Additionally, the scrubbing unit scrubs and makes available for allocation an additional amount of memory in parallel with and subsequent to execution of boot-up operation of the operating system.

In another embodiment of the invention, the system includes a plurality of nodes, each of the plurality of nodes having a minimum node resource configuration associated therewith, at least one partition that includes at least one of the plurality of nodes, a plurality of processors included in each of the plurality of nodes, a plurality of cores included in each of the plurality of processors, and a plurality of memory controllers. Each of the plurality of cores interfaces with at least one of the plurality of memory controllers, each of the plurality of memory controllers controls at least one of the memory units, and the minimum node resource configuration corresponds to a minimum number of processors included in a node that are required to be activated in order to activate the node.

Another embodiment of the invention includes a computer-readable medium storing a computer program for causing a computer to perform a process for accelerating a wake-up time of a system. Examples of such media include non-transitory media such as fixed disks (where the program can be pre-loaded), removable disks, tapes, cards, and the like; for example, the medium may be of the electronic, magnetic, optical, or semiconductor type. Examples of such media also include transitory media such as networks and media, for example, of the electromagnetic or infrared type. The process includes scrubbing and making available for allocation a minimum amount of memory, executing a boot-up operation of an operating system stored on the system, and scrubbing and making available for allocation an additional amount of memory in parallel with and subsequent to the boot-up operation of the operating system.

The system of one or more of the previously disclosed embodiments may include a plurality of partitions, each of the plurality of partitions including at least one node having a minimum node resource configuration associated therewith such that the node is activated on the condition that the minimum node resource configuration is established. Further, each of the plurality of partitions may be assigned a priority in relation to other partitions and the plurality of partitions may be successively activated based on the assigned priorities.

These and other embodiments of the invention are described in detail with reference to the following drawings.

DETAILED DESCRIPTION

Figure 1:
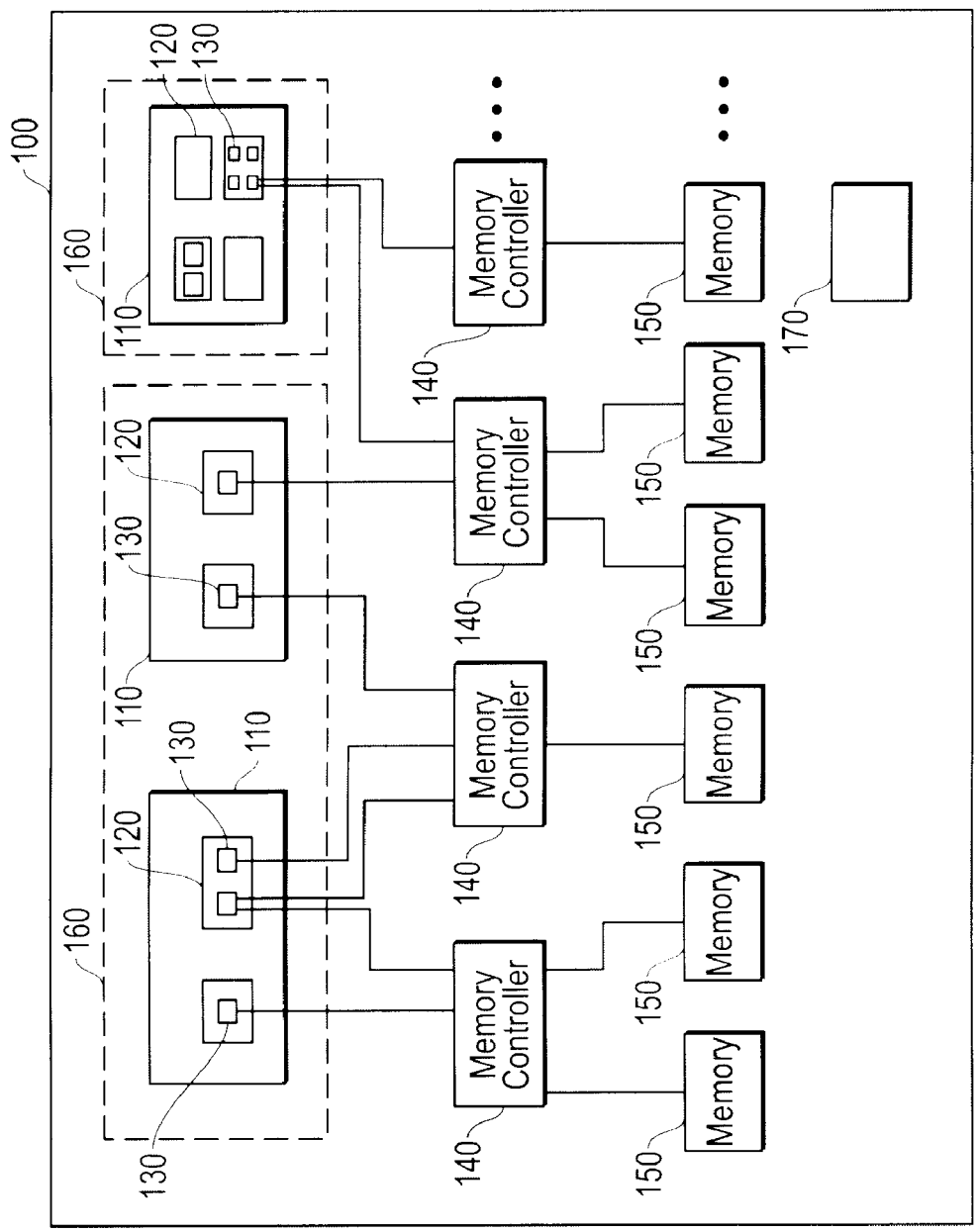
FIG. 1 sets forth a block diagram illustrating a system in accordance with one or more embodiments of the invention.

As will be appreciated by one skilled in the art, embodiments of the invention may be embodied as a system, method or computer program product. Accordingly, embodiments of the invention may take the form of an entirely hardware embodiment, an entirely software embodiment (including firmware, resident software, micro-code, etc.) or an embodiment combining software and hardware embodiments that may all generally be referred to herein as a "circuit." "module" or "system." Furthermore, embodiments of the invention may take the form of a computer program product embodied in one or more computer readable medium(s) having computer readable program code embodied thereon.

Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a system in accordance with one or more embodiments of the invention includes a server 100 having one or more nodes 110 included therein. The nodes 110 may also be referred to as node books, processor books, or drawers. Each of the nodes 110 includes one or more processors 120 and each of the processors 120 includes one or more cores 130. Each core 130 interfaces with one or more memory controllers 140. Each memory controller 140 controls one or more memory units 150. The server 100 may be, as an example, a high-end POWER server that includes up to 8 nodes, with each node including as many as 4 processors.

In addition, the server 100 in accordance with one or more embodiments of the invention may include one or more logical partitions 160 defined thereon. A partition 160 may span or encompass one or more nodes 110. Whereas a node 110 is a physical entity included in the server 100, a partition 160 is a logical entity defined on the server 100. Each partition 160 may have a same or different operating system (not shown) installed therein. The server 100 may include a host operating system (not shown) that may also referred to as a hypervisor. The hypervisor provides for hardware control and monitoring of other operating systems that may be loaded on various other partitions. In addition, each partition 160 may have various applications (not shown) installed therein in addition to the installed operating system(s). Further, a single user or different users may control different partitions.

Each of the memory units 150 may be a dual in-line memory module (DIMM). A DIMM includes a series of dynamic random access memory (DRAM) integrated circuits. The DIMMs may be of any suitable type used in the industry. Further, the DIMMs may be ECC (Error Correcting Code) DIMMs that include extra data bits that are used by a memory controller to detect and/or correct bit errors. The particular FCC scheme employed is not limited and may be any scheme capable of detecting and/or correcting bit errors. For example, the ECC scheme employed may be a Single Error Correct. Double Error Detect (SECDED) scheme which uses an extra byte (combination of 8 bits) for each 64-bit word. An example of such an error-correcting scheme is a Hamming Code.

Referring again to FIG. 1, the server 100 in accordance with one or more embodiments of the invention includes a memory scrubbing unit 170. The memory scrubbing unit 170 may be a service processor such as a flexible service processor (FSP). Memory scrubbing is a technique employed to ensure the reliability of the server 100. Thus, memory scrubbing falls within the purview of the RAS (Reliability, Availability, Serviceablity) paradigm for servers and other computing devices with long uptimes. Memory scrubbing generally involves writing a pre-defined test pattern to a memory address, reading a pattern from the memory address, and comparing the read pattern to the original test pattern to identify potential bit errors.

In conventional systems, memory scrubbing using one or more test patterns is performed on the entire memory in the system prior to initiating a boot-up operation of the one or more operating systems installed on the system and moving the system to a run-time state. Subsequent to the loading of a host operating system, one or more partitions defined on the system may be activated. Such systems are inefficient because they require scrubbing of the entire memory of the system prior to moving the system to a run-time state regardless of whether all of the memory will eventually be used by the system.

Figure 2:
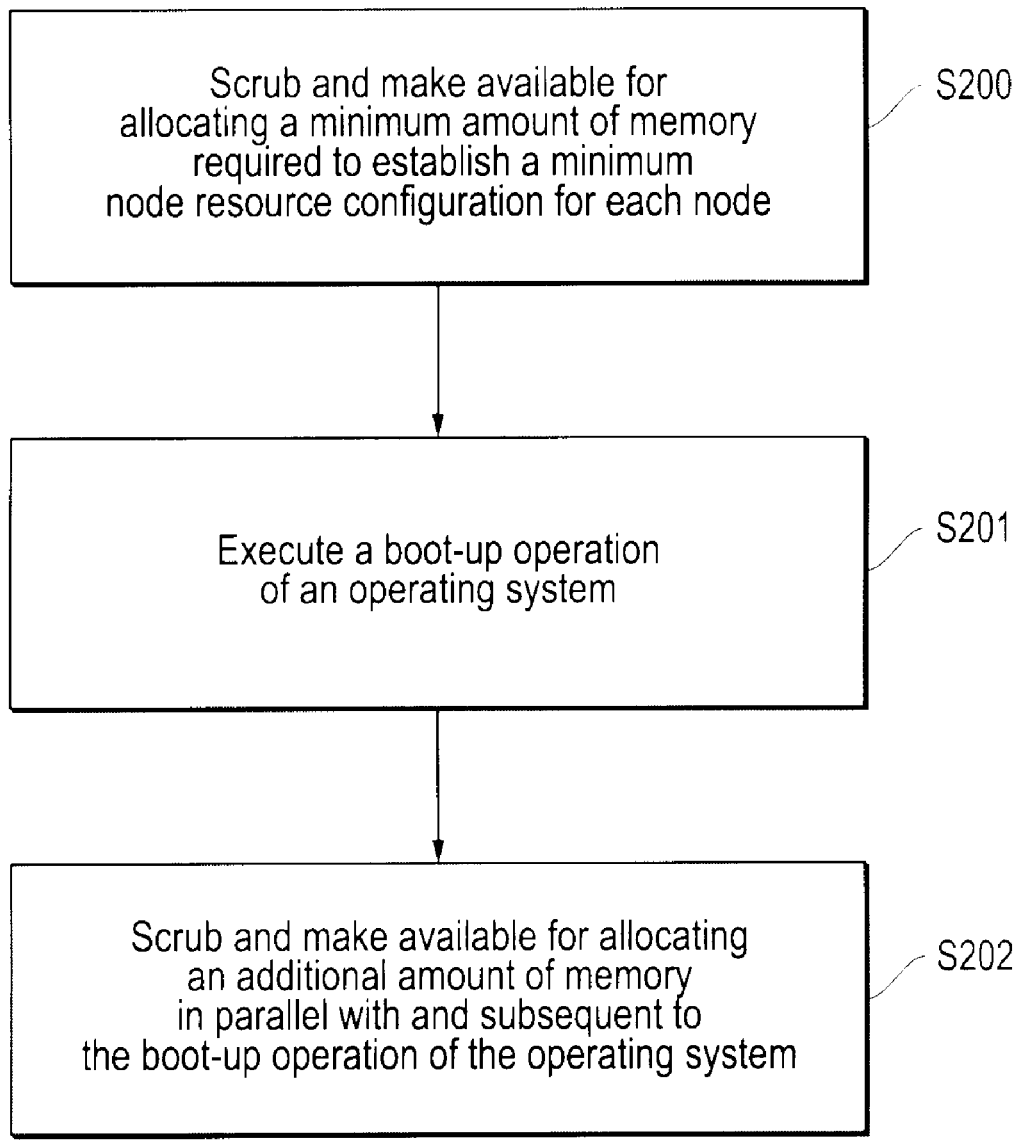
FIG. 2 sets forth a flow chart illustrating a method in accordance with one or more embodiments of the invention.

FIG. 2 is a flow chart illustrating a method in accordance with one or more embodiments of the invention. Referring to FIG. 2, in step S200 of the method, a minimum amount of memory in one or more memory units is scrubbed and made available for allocation. A memory unit may refer to a single DIMM. The amount of memory on which a scrubbing operation is performed may not include all memory units present in the server or all memory within a single memory unit. More specifically, the minimum amount of memory that is scrubbed may correspond to an amount of memory necessary to establish a minimum node resource configuration that is specified for each node.

In particular, referring again to FIG. 1, each memory controller 140 controls one or more memory units 150. Prior to initialization of a boot-up operation of an operating system loaded on the server 100, each memory controller 140 is initially in a disabled state. After a memory scrubbing operation is performed on a minimum amount of memory in at least one memory unit that a particular memory controller controls, the memory controller transitions from a disabled state to an enabled state such that the scrubbed memory associated with that memory controller become available for allocation to one or more nodes.

Referring again to FIG. 1, each node 110 may include one or more processors 120, which in turn may include one or more cores 130. Each core 130 interfaces with one or more memory controllers 140. After at least a minimum amount of memory in at least one of the memory units 150 that a particular memory controller 140 controls is subjected to a memory scrubbing operation, the memory controller is enabled. The scrubbed memory then becomes available for allocation to the core 130 of a processor 120 included within a node 110.

As noted above, a minimum node resource configuration is specified for each node. The minimum node resource configuration corresponds to a minimum amount of memory that must be scrubbed and made available for allocation to the node in order to activate the node (i.e. make the node operational and ready for use by the system). The minimum node resource configuration further corresponds to a minimum number of processors included in a node that must be activated in order to activate the node. Additionally, the minimum node resource configuration further corresponds to a minimum number of cores included in a processor that must be activated in order to activate a node.

As an example, a minimum node resource configuration may require an allocation of at least 16 GB of scrubbed memory and at least two active cores in order to activate a node. Thus, if a particular node includes 4 processors and each processor includes 2 cores, the minimum node resource configuration for the node may require an allocation of 16 GB of scrubbed memory among 1 core in each of 2 of the 4 processors in order to activate the node. A minimum node resource configuration for a node thus corresponds to the minimum amount of scrubbed memory that must be available for allocation to a minimum core/processor combination required to activate a node.

Referring again to FIG. 2, after the minimum amount of memory necessary to establish the minimum node resource configuration for each node has been scrubbed and made available for allocation, a boot-up operation of a host operating system loaded on the server is executed (S202). In step S203, an additional amount of memory is scrubbed and made available for allocation in parallel with and subsequent to the boot-up operation of the operating system.

Again referring to FIG. 1, the server 100 in accordance with one or more embodiments of the invention may include one or more logical partitions 160 defined thereon which encompass one or more nodes 110. The partition 160 is a logical entity defined on the server that spans or encompasses one or more nodes. Each partition 160 requires a certain memory allocation based on the operating system(s) and/or applications that may be associated with and running in that partition. Further, each of the one or more partitions 160 may be assigned a priority in relation to all other partitions. A priority assigned to a particular partition may be one factor in determining at which point the partition will be activated in relation to other partitions.

More specifically, one partition may be assigned the highest priority among all partitions. Each remaining partition may then be assigned a unique priority, thereby ordering the partitions from highest to lowest priority. The priority assigned to a particular partition may be static. Alternatively, the priority of a partition may change depending on, for example, a demand for memory resources of the partition.

Figure 3:
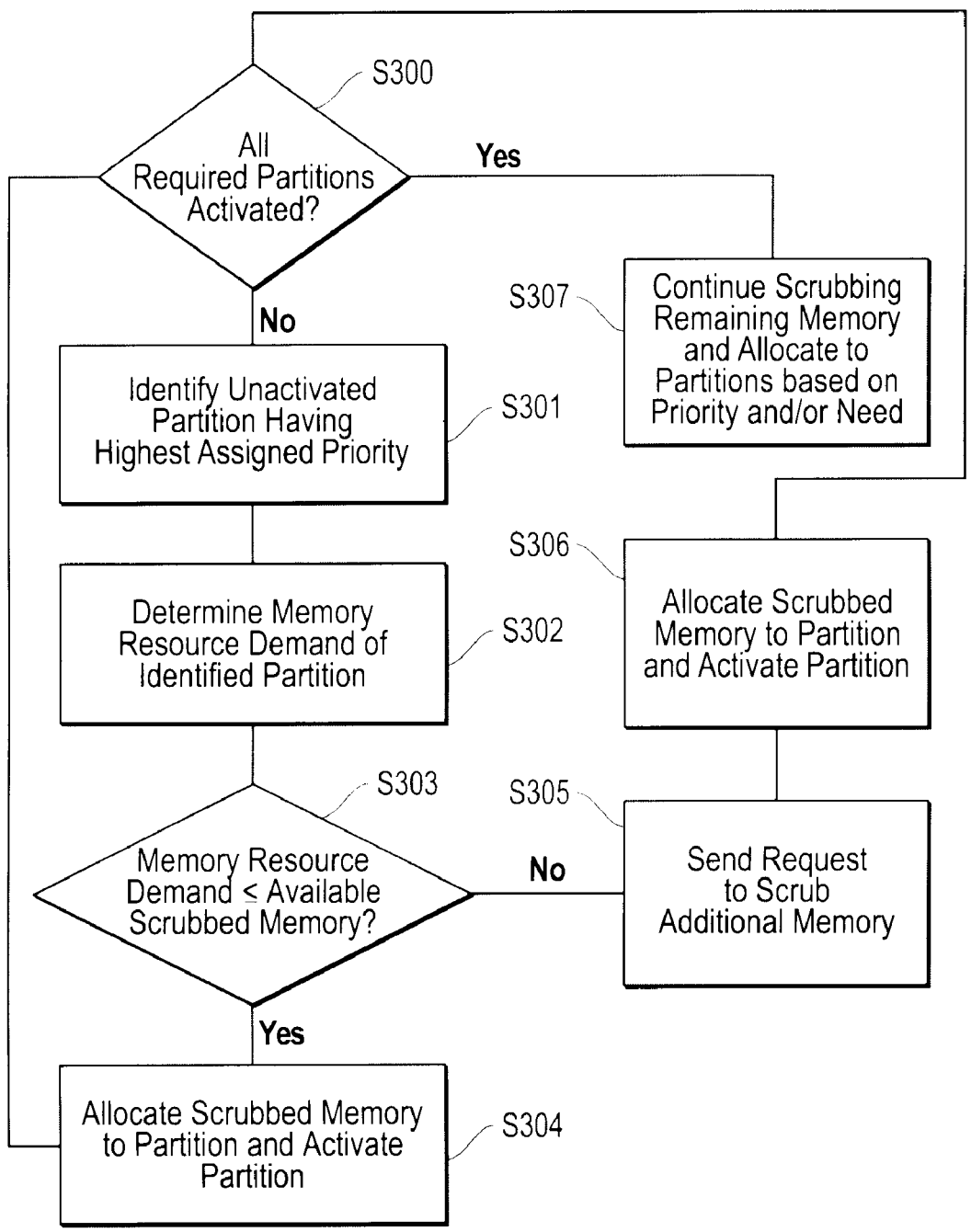
FIG. 3 sets forth a flow chart illustrating a method in accordance with one or more embodiments of the invention.

FIG. 3 illustrates a flow chart that provides a schematic representation of a method in accordance with one or more embodiments of the invention. As an initial step in the method, a determination is made as to whether all required partitions have been activated (S300). If it is determined that all required partitions have been activated, remaining unallocated memory is scrubbed and allocated to one or more partitions based on criteria such as partition priority and/or a partition's demand for additional memory resources (S307).

Block S307 will be described in further detail later. Alternatively, if it is determined that there are unactivated partitions that require activation, the partition having the highest priority in relation to all other partitions that require activation in order to maintain the operating state of the server is identified (S301). Subsequently, in step S302 of the method, a memory resource demand of the partition identified in step S301 is determined.

The memory resource demand of a partition refers to an amount of memory that must be scrubbed and made available for allocation to the partition in order to activate the partition. Depending on the memory resource demand of the partition, one or more nodes encompassed by the partition may be activated. For example, a single node may be activated with the minimum node resource configuration of that node in a scenario where the memory resource demand of the partition is low. Alternatively, more than one node encompassed by a partition may be activated when the memory resource demand of the partition is high. For example, where a partition includes more than one node, and a single node having memory allocated thereto is not capable of meeting the memory resource demand of the partition, one or more additional nodes may be activated to meet the memory resource demand of the partition.

Referring again to FIG. 3, after the memory resource demand of the partition is determined (S302), the memory resource demand is compared to the amount of memory that has been scrubbed and made available for allocation (S303). If it is determined that the memory resource demand is less than or equivalent to the amount of available scrubbed memory (i.e. the amount of scrubbed memory available for allocation is sufficient to meet the memory resource demand of the partition), then an amount of scrubbed memory capable of meeting the memory resource demand of the partition is allocated to the partition and the partition is activated (S304).

After the partition is activated in step S304, a determination is again made as to whether all required partitions have been activated (S300). If it is determined that all required partitions have been activated at this stage, a memory scrubbing operation is performed on the remaining unallocated memory (S307). The resultant scrubbed memory is then allocated to one or more partitions based on various criteria including a partition priority and/or a memory resource demand of a partition (S307). Alternatively, if it is determined that there are additional partitions that require activation, the partition now having the highest assigned priority among the unactivated partitions that require activation is identified (S301).

If it is determined in step S303 that the amount of scrubbed memory available for allocation is not sufficient to meet the memory resource demand of the partition, a request is sent to the scrubbing unit 70 (FIG. 1) to scrub and make available for allocation an additional amount of memory such that a total amount of memory available for allocation meets the memory resource demand of the partition (S305). Thereafter, an amount of scrubbed memory sufficient to meet the memory resource demand of the partition is allocated to the partition and the partition is activated (S306). After the partition is activated, a determination is once again made as to whether all required partitions have been activated (S300), and the method of this embodiment continues as described above.

As described above, in step S307, a memory scrubbing operation is performed on the remaining unallocated memory which is then allocated to one or more partitions based on variation in priority among the partitions and/or variation in memory resource demand of the partitions. Memory allocation may be executed through a Dynamic Logical Partitioning (DLPAR) mechanism that allows for memory to be allocated to or removed from a given partition without having to shut down and re-boot an operating system running in the partition. Allocation of memory may also be dynamically transferred from a given partition to another partition based on partition priority and/or a memory resource demand of a partition.

Additionally, after all required partitions have been activated and sufficient memory resources have been allocated to each partition, further memory scrubbing may be performed on used memory during a period when a partition does not require allocation of the memory rather than scrubbing unused memory. In this manner, memory that is not used need not be scrubbed.

In one or more embodiments of the invention, the scrubbing unit 170 (FIG. 1) may be, for example, a service processor having firmware associated therewith. As described earlier, the memory units 150 (FIG. 1) may be DIMMs. However, it is important to note that the memory units 150 may be any type of memory used in the industry and are not restricted to DIMMs. Each DIMM may have a certain number of ranks associated therewith that may correspond to the number of independent sets of DRAMs that can be accessed for the full data bit-width of the DIMM (e.g. 64 bits).

In one or more embodiments of the invention, the service processor firmware may maintain an indexed table of DIMM and RANK ids. A value at a particular location in the indexed table may indicate whether a particular RANK in a particular DIMM that is represented by that location has been scrubbed.

Figure 4:
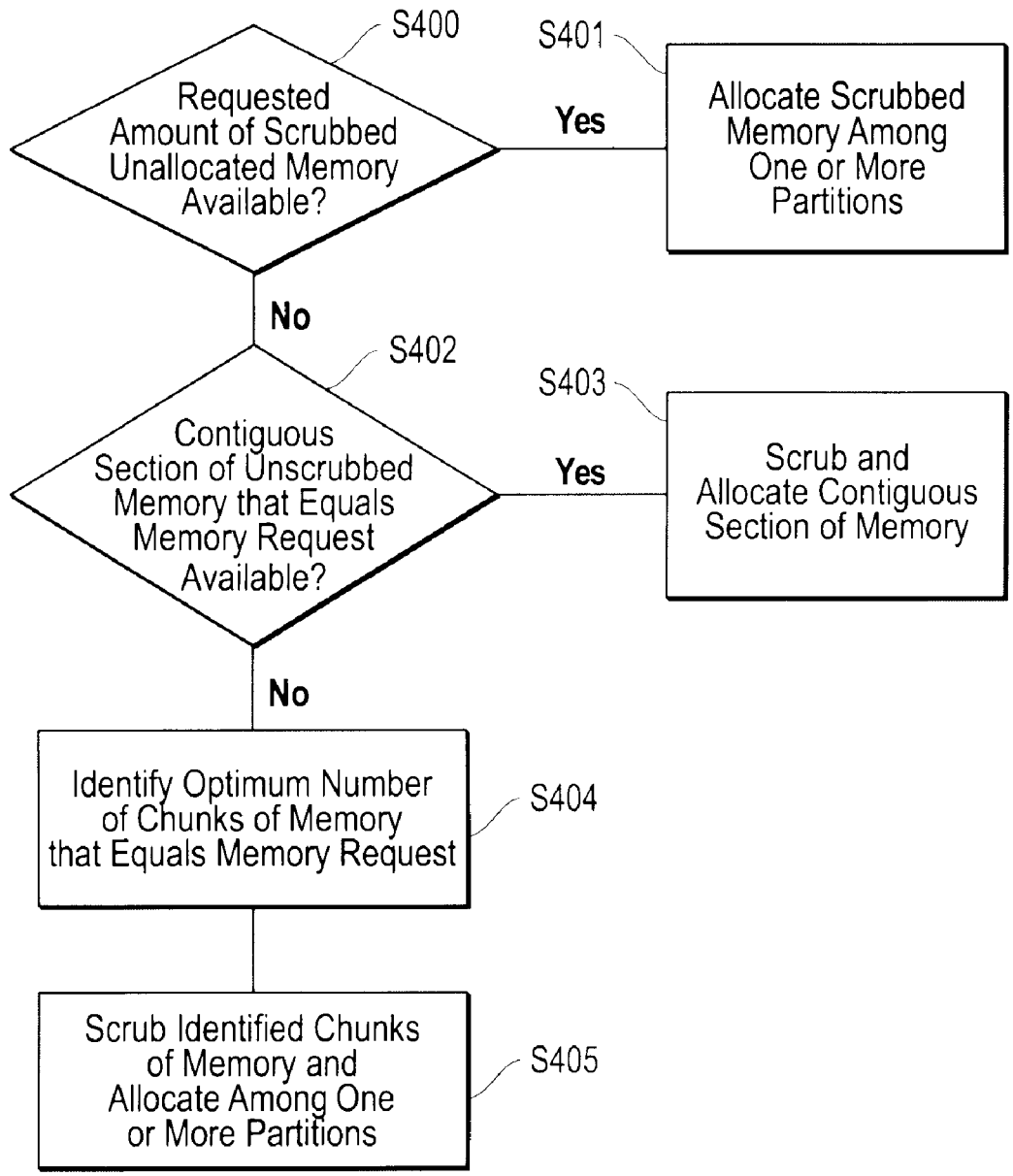
FIG. 4 sets forth a flow chart illustrating a method in accordance with one or more embodiments of the invention.

FIG. 4 illustrates a flow chart of a method in accordance with one or more embodiments of the invention. In response to a request for additional memory allocation, in step S400 of the method, the service processor firmware performs a look-up operation on the indexed table to determine if the required amount of scrubbed, unallocated memory is available. If an amount of scrubbed, unallocated memory sufficient to meet the request for additional memory is available, the amount of scrubbed memory sufficient to satisfy the memory request is allocated among one or more partitions (S401).

If an amount of scrubbed, unallocated memory available is not sufficient to meet the additional memory demand, the service processor firmware searches for a contiguous section of unscrubbed memory that corresponds to the size of memory requested (S402). If the service processor firmware determines that a contiguous section of unscrubbed memory is available for allocation, the contiguous section of memory is scrubbed and allocated among one or more partitions (S403).

On the other hand, if in step S402, the service processor firmware determines that a contiguous section of unscrubbed memory that corresponds to a size of the amount of memory requested for allocation is not available, the firmware identifies an optimum number of chunks of memory (some of which may be noncontiguous) that have a combined size that corresponds to the size of the memory requested for allocation (S404). The optimum number may, for example, be a minimum number of noncontiguous chunks of memory that correspond to the size of the memory requested. Thereafter, the identified chunks of memory are scrubbed and allocated among one or more partitions (S405). It should be noted that because the size of the memory requested for allocation may not be a multiple of the size of the RANKs, the service processor firmware may instead search for and scrub an amount of memory having a size that is the next nearest multiple size of a RANK.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose.

While the invention has been particularly shown, described and illustrated in detail with reference to one or more embodiments and modifications thereof, it should be understood by those skilled in the art that equivalent changes in form and detail may be made therein without departing from the true spirit and scope of the invention as claimed. To the extent such modifications fall within the scope of the appended claims and their equivalents, they are intended to be covered by this patent.

What is claimed is:

1. A method for accelerating a wake-up time of a system, the method comprising:
   scrubbing and making available for allocation a minimum amount of memory;
   executing a boot-up operation of an operating system stored on the system; and
   scrubbing and making available for allocation an additional amount of memory in parallel with and subsequent to the boot-up operation of the operating system, the system comprising:
   a plurality of memory units;
   a plurality of nodes, each of the plurality of nodes having a minimum node resource configuration associated therewith;
   a plurality of processors included in each of the plurality of nodes;
   a plurality of cores included in each of the plurality of processors; and
   a plurality of memory controllers, each of the plurality of cores interfaces with at least one of the plurality of memory controllers,
      each of the plurality of memory controllers controls at least one of the plurality of memory units, and
      the minimum node resource configuration corresponds to the minimum amount of scrubbed memory in one or more of the plurality of memory units that must be made available for allocation to a minimum number of core and processor combinations in order to activate at least one of the plurality of nodes.

2. The method of claim 1, wherein:
   each of the plurality of memory controllers is initially in a disabled state, and
   at least one of the plurality of memory controllers is enabled on the condition that a minimum amount of memory is scrubbed in at least one of the plurality of memory units that the memory controller controls.

3. The method of claim 1, wherein the system further comprises:
   a plurality of partitions, wherein each of the plurality of partitions encompasses at least one of the plurality of nodes, each of the plurality of partitions is assigned a priority in relation to the other partitions, and the plurality of partitions are successively activated based on the assigned priorities.

4. The method of claim 3, further comprising:
activating a partition on the condition that a sufficient amount of scrubbed memory is available for allocation to meet a memory resource demand of the partition.

5. The method of claim 4, further comprising:
prior to activating a partition, comparing the memory resource demand of the partition to an amount of memory that has been scrubbed and made available for allocation,
wherein on the condition that the amount of memory that has been scrubbed and made available for allocation is sufficient to meet the memory resource demand of the partition, the scrubbed memory is allocated among one or more of the nodes encompassed by the partition and the partition is activated, and
wherein on the condition that the amount of memory that has been scrubbed and made available for allocation is not sufficient to meet the memory resource demand of the partition,
an additional amount of memory is scrubbed such that a total amount of scrubbed memory sufficient to meet the memory resource demand of the partition is allocated among one or more of the nodes encompassed by the partition and the partition is activated.

6. The method of claim 3, wherein in parallel with and subsequent to the execution of the boot-up operation of the operating system, additional memory is scrubbed and allocated to one or more or of the nodes encompassed by each of the partitions based on criteria.

7. The method of claim 6, wherein the criteria includes at least one of a priority assigned to the partition and a demand of the partition for additional allocation of memory.

8. The method of claim 1, wherein the additional memory that is scrubbed includes used memory.

9. A system comprising:
a plurality of memory units;
a scrubbing unit configured to scrub memory in one or more of the plurality of memory units and make the scrubbed memory available for allocation; and
an operating system,
the scrubbing unit making available for allocation a minimum amount of scrubbed memory, a boot-up operation of the operating system is executed after the minimum amount of memory has been scrubbed and made available for allocation, and
the scrubbing unit scrubs and makes available for allocation an additional amount of memory in parallel with and subsequent to execution of boot-up operation of the operating system,
the system further comprising:
a plurality of nodes having a minimum node resource configuration associated therewith;
a plurality of processors included in each of the plurality of nodes;
a plurality of cores included in each of the plurality of processors; and
a plurality of memory controllers, each of the plurality of cores interfaces with at least one of the plurality of memory controllers,
each of the plurality of memory controllers controls at least one of the memory units, and
the minimum node resource configuration corresponds to the minimum amount of scrubbed memory that must be made available for allocation to a minimum number of core and processor combinations in order to activate at least one of the plurality of nodes.

10. The system of claim 9, wherein:
each of the plurality of memory controllers is initially in a disabled state, and
at least one of the plurality of memory controllers is enabled on the condition that the scrubbing unit scrubs a minimum amount of memory in at least one of the plurality of memory units that the memory controller controls.

11. The system of claim 9, further comprising:
a plurality of partitions, wherein each of the plurality of partitions encompasses at least one of the plurality of nodes,
each of the plurality of partitions is assigned a priority in relation to the other partitions, and the plurality of partitions are successively activated based on the assigned priorities.

12. The system of claim 11, wherein:
a partition is activated on the condition that a sufficient amount of memory has been scrubbed by the scrubbing unit and made available for allocation to meet a memory resource demand of the partition.

13. The system of claim 12, wherein:
prior to activating a partition, the memory resource demand of the partition is compared to an amount of memory that has been scrubbed and made available for allocation by the scrubbing unit,
wherein on the condition that the amount of memory that has been scrubbed and made available for allocation is sufficient to meet the memory resource demand of the partition, the scrubbed memory is allocated among one or more of the nodes encompassed by the partition and the partition is activated, and
wherein on the condition that the amount of memory that has been scrubbed and made available for allocation by the scrubbing unit is not sufficient to meet the memory resource demand of the partition, the scrubbing unit scrubs an additional amount of memory such that a total amount of scrubbed memory sufficient to meet the memory resource demand of the partition is allocated among one or more of the nodes encompassed by the partition and the partition is activated.

14. The system of claim 11, wherein in parallel with and subsequent to the execution of the boot-up operation of the operating system, the scrubbing unit scrubs and allocates an additional amount of memory to one or more of the nodes encompassed by each of the partitions based on criteria.

15. The system of claim 14, wherein the criteria includes at least one of a priority assigned to the partition and a demand of the partition for additional allocation of memory.

16. A non-transitory computer-readable medium storing a computer program for causing a computer to perform a process for accelerating a wake-up time of a system, the process comprising:
scrubbing and making available for allocation a minimum amount of memory;
executing a boot-up operation of an operating system stored on the system; and
scrubbing and making available for allocation an additional amount of memory in parallel with and subsequent to the boot-up operation of the operating system,
the system comprising:
a plurality of memory units;
a plurality of nodes, each of the plurality of nodes having a minimum node resource configuration associated therewith such that the node is activated on the condition that the minimum node resource configuration is established, a plurality of processors included in each of the plurality of nodes;

a plurality of cores included in each of the plurality of processors; and a plurality of memory controllers, each of the plurality of cores interfaces with at least one of the plurality of memory controllers, and a plurality of partitions, wherein each of the partitions encompasses at least one of the plurality of nodes, each of the plurality of partitions is assigned a priority in relation to other partitions, and the plurality of partitions are successively activated based on the assigned priorities, and the minimum node resource configuration corresponds to the minimum amount of scrubbed memory that must be made available for allocation to minimum number of core and processor combinations in order to activate at least one of the plurality of nodes.

17. The non-transitory computer readable medium of claim 16, each of the plurality of memory controllers is initially in a disabled state, and at least one of the plurality of memory controllers is enabled on the condition that a minimum amount of memory in at least one memory unit that the memory controller controls is scrubbed.

* * * * *